United States Patent [19]
Klein et al.

[11] Patent Number: 5,910,778
[45] Date of Patent: Jun. 8, 1999

[54] EMBEDDED PROTOCOL

[75] Inventors: Thomas L. Klein, West Palm Beach; Gary J. Morse, Boca Raton; Robert N. Nelms, Boynton Beach, all of Fla.

[73] Assignee: Motorola, Inc., Schaumburg, Ill.

[21] Appl. No.: 08/999,617

[22] Filed: Aug. 28, 1997

Related U.S. Application Data

[63] Continuation of application No. 08/531,932, Sep. 21, 1995, abandoned.

[51] Int. Cl.$^6$ .................................................. H04Q 7/14
[52] U.S. Cl. .............................. 340/825.44; 340/825.47; 340/825.27
[58] Field of Search ..................... 340/825.44, 825.47, 340/825.26, 825.27, 311.1; 455/38.4

[56] References Cited

U.S. PATENT DOCUMENTS

| | | | |
|---|---|---|---|
| 4,369,443 | 1/1983 | Giallanza et al. | 340/825.47 |
| 4,845,491 | 7/1989 | Fascenda et al. | 340/825.44 |
| 5,025,252 | 6/1991 | DeLuca et al. | 340/825.44 |
| 5,173,688 | 12/1992 | DeLuca et al. . | |
| 5,241,305 | 8/1993 | Fascenda et al. . | |
| 5,345,227 | 9/1994 | Fascenda et al. . | |
| 5,426,422 | 6/1995 | Vanden Heuvel et al. | 340/825.27 |
| 5,426,424 | 6/1995 | Vande Heuvel et al. | 340/825.44 |
| 5,440,299 | 8/1995 | Schwendeman | 340/825.44 X |
| 5,546,077 | 8/1996 | Lipp et al. | 340/825.44 |

*Primary Examiner*—Edwin C. Holloway, III
*Attorney, Agent, or Firm*—James A. Lamb

[57] ABSTRACT

A technique is for receiving variable length messages in a selective call receiver (68) having a processor (110) coupled to a memory element (86). The selective call receiver (68) is configured to receive a signal transmitted in a standard protocol format comprising an address portion (14) and a message portion (16). First, second, third, and fourth configuration values are stored within the selective call receiver (68) from which determinations are made, respectively, whether the selective call receiver (68) is permitted to process sub-address information (22, 24) included within the message portion, whether said selective call receiver (68) is permitted to receive a particular sub-address included in the message portion, whether said selective call receive (68) is permitted to process a processor command (26) included in the message portion, and whether said selective call receiver (68) is permitted to receive and process a particular processor command included in the message portion.

6 Claims, 8 Drawing Sheets

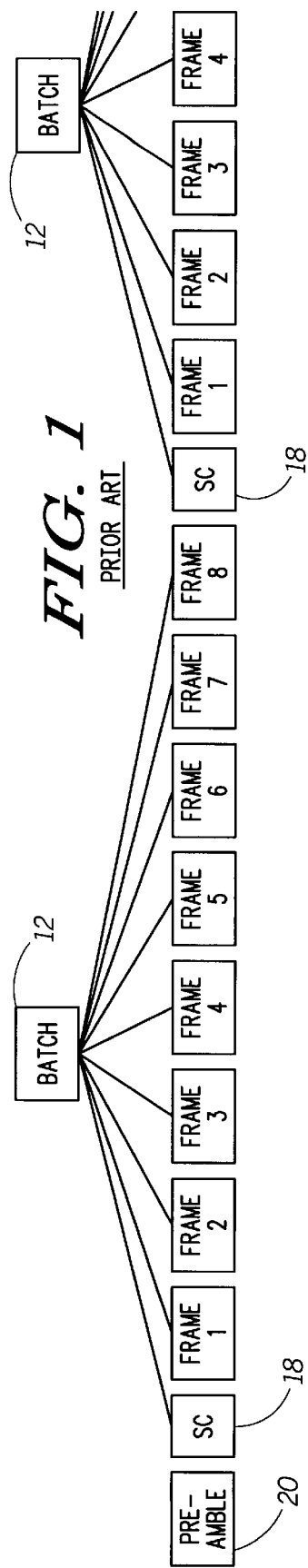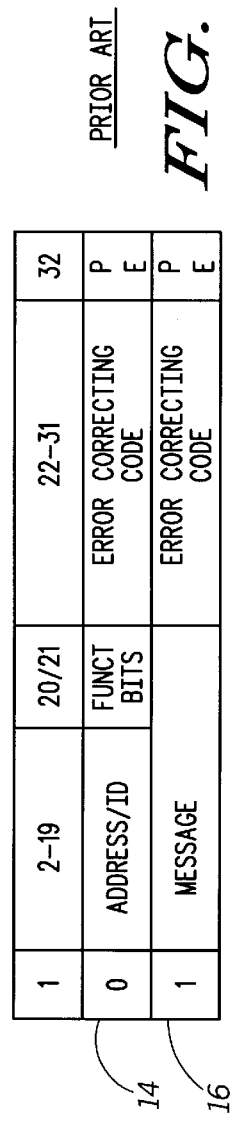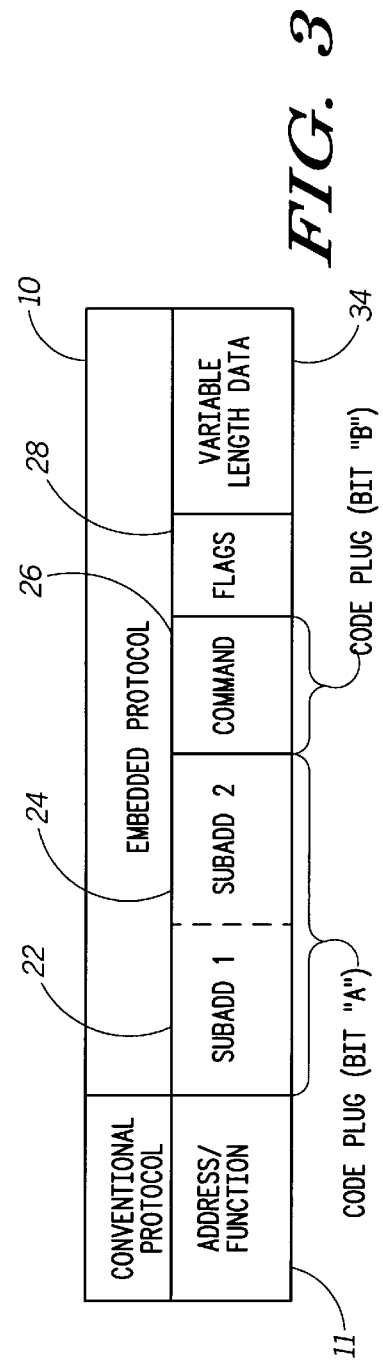

FIG. 4

| ADDRESS/FUNCTION | BIT"A" | BIT"B" | SUB-ADDRESS/COMMAND CONFIGURATION (RAM OR CODE PLUG) |
|---|---|---|---|
| 1 | 0 | 0 | |
| 2 | 1 | 1 | 2A 2B ... N |
| ... | ... | ... | 112 114 |
| 16 | 1 | 1 | |

FIG. 5

| COMMAND NAME | COMMAND FORMAT AND PARAMETERS | | |
|---|---|---|---|
| | 7 BITS | 7 BITS | N BITS |
| NEW MESSAGE | COMMAND CODE (0X3A) | FLAGS | DATA |
| | 30 | 28 | 34 |

FIG. 6

| COMMAND NAME | COMMAND FORMAT AND PARAMETERS | | |
|---|---|---|---|
| | 7 BITS | 7 BITS | N BITS |
| SHORT OFFSET UPDATE | COMMAND CODE (0X3A) | OFFSET CHARACTER | DATA |
| | 36 | 38 | 34 |

FIG. 7

| COMMAND NAME | COMMAND FORMAT AND PARAMETERS | | | |
|---|---|---|---|---|
| | 7 BITS | 7 BITS | 7 BITS | N BITS |
| SHORT OFFSET UPDATE WITH FLAGS | COMMAND CODE (0X34) | OFFSET CHARACTER | FLAGS | DATA |
| | 9 | 38 | 28 | 34 |

FIG. 8

| COMMAND NAME | COMMAND FORMAT AND PARAMETERS | | | |
|---|---|---|---|---|
| | 7 BITS | 7 BITS | 7 BITS | N BITS |
| LONG OFFSET UPDATE | COMMAND CODE (0X38) | FLAGS | OFFSET CHARACTER 1 | OFFSET CHARACTER 2 | DATA |

| COMMAND NAME | COMMAND FORMAT AND PARAMETERS | | | |
|---|---|---|---|---|
| | 7 BITS | 7 BITS | 7 BITS | 7 BITS |
| MULTIPLE SHORT OFFSET UPDATE | COMMAND CODE (0X36) | FLAGS | OFFSET CHARACTER 1.1 | DATA LENGTH 1 |

COMMAND FORMAT AND PARAMETERS (CONTINUED)

| N BITS | 7 BITS | 7 BITS | ... | 7 BITS | 7 BITS | N BITS |
|---|---|---|---|---|---|---|
| DATA 1 | OFFSET CHARACTER 1.2 | DATA LENGTH 2 | DATA 2 | ... | OFFSET CHARACTER 1.n | DATA LENGTH n | DATA n |

| COMMAND NAME | COMMAND FORMAT AND PARAMETERS | | | |
|---|---|---|---|---|
| | 7 BITS | 7 BITS | 7 BITS | 7 BITS | 7 BITS |
| MULTIPLE LONG OFFSET UPDATE | COMMAND CODE (0X32) | FLAGS | OFFSET CHARACTER 1.1 | OFFSET CHARACTER 2.1 | DATA LENGTH 1 |

58, 28, 60, 62, 64

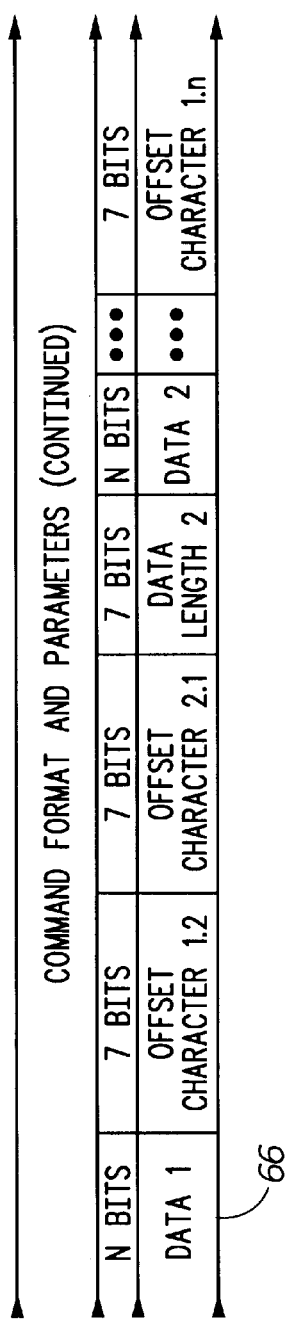
FIG. 12
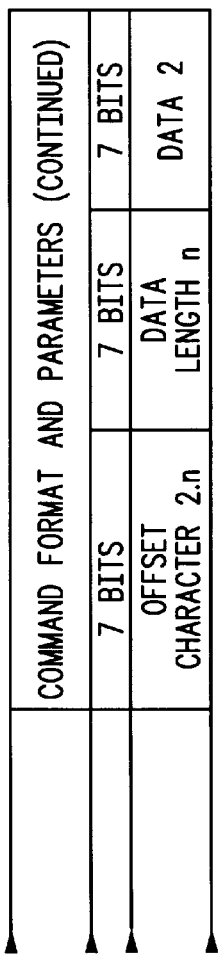
FIG. 13
FIG. 14
| 6 | 5 | 4 | 3 | 2 | 1 | 0 |
|---|---|---|---|---|---|---|
| FOR FUTURE USE | PROTOCOL VERSION HIGH BIT | PROTOCOL VERSION LOW BIT | ALERT OVERRIDE | FOR FUTURE USE | FOR FUTURE USE | FOR FUTURE USE |
FLAGS CHARACTER BITS

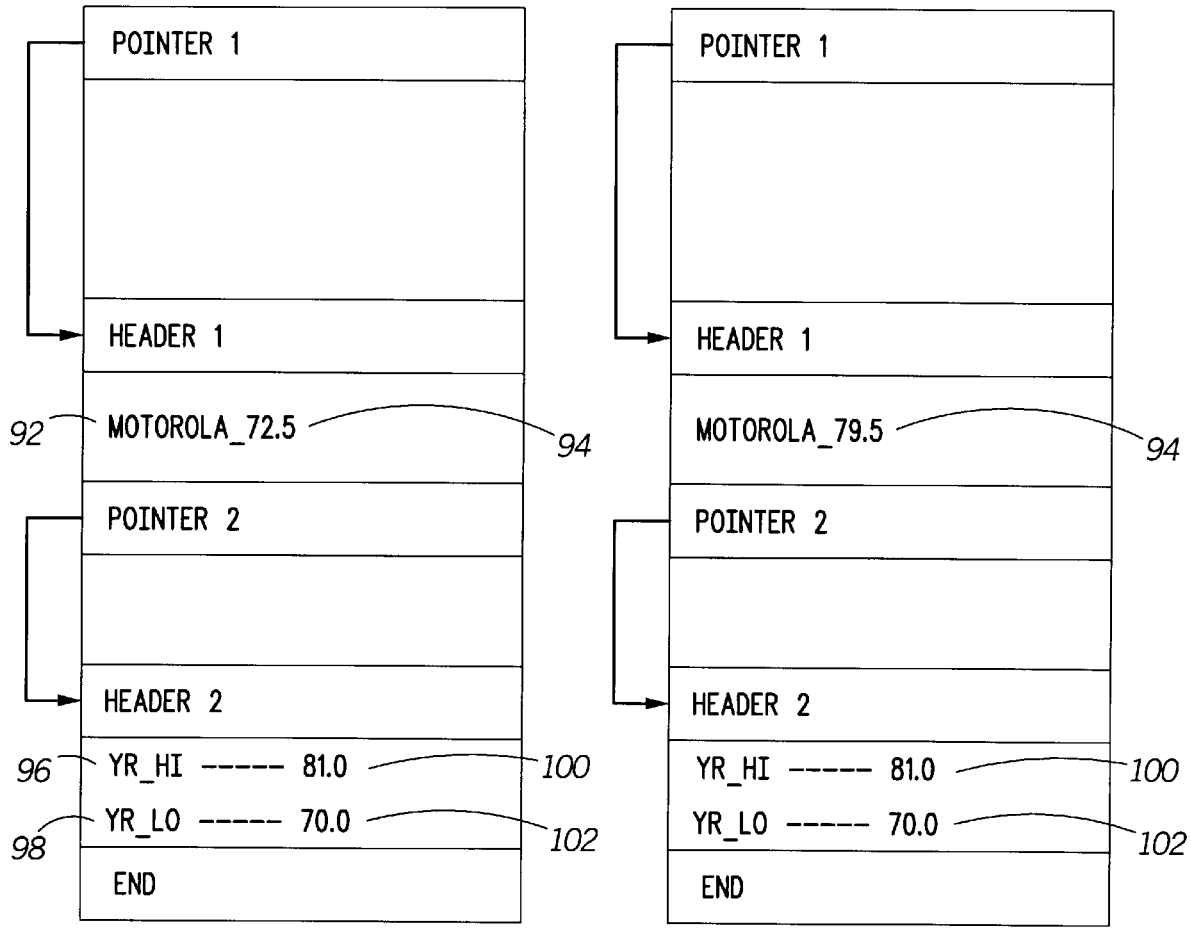
FIG. 15         FIG. 16
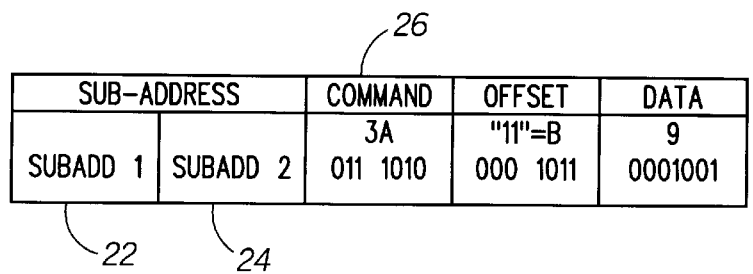
FIG. 17

EMBEDDED PROTOCOL

This is a continuation of application Ser. No. 08/531,932, filed Sep. 21, 1995 and now abandoned.

FIELD OF THE INVENTION

This invention relates generally to an improved method for disseminating and receiving messages, and, more particularly to an extendible embedded protocol which defines an improved method by which individual and multi-recipient messages are transmitted and received in selective call receivers. Additionally, this invention relates to a selective call receiver configured to utilize the embedded protocol.

BACKGROUND OF THE INVENTION

Paging systems today employ a variety of protocols to uniquely address and transmit data to selective call message receivers. One such protocol is called POCSAG (an acronym for Post Office Code Standardization Advisory Group) in which transmissions are sent out in batches. A POCSAG batch 12, as shown in FIG. 1, consists of eight frames, each frame consisting of two code-words 14–16 (FIG. 2). As shown, transmissions are initiated by broadcasting a preamble 20 which consists of a square wave which has a minimum of 576 reversals. Preamble 20 is followed by a 32 bit synchronization code 18 (a unique 32.21 code-word) which in turn is followed by the eight frames which contain address and message information. Each frame is made up of two 32-bit code-words 14 and 16. As shown in FIG. 2. code words 14 and 16 have slightly different formats depending upon whether they contain an address, identifying which of the two million pagers the message is intended for, or a message. In particular, code-word 14 which contains an address has its most significant bit set to "0" while code-word 16 which contains a message has its most significant bit set to "1."

An advantage of conventional selective call message receivers using the POCSAG protocol is that they do not monitor each frame. Rather, each individual selective call receiver monitors only a predetermined one of the frames, such as frame 3, to save their batteries. Accordingly, after synchronization code 18 (FIG. 1) is received the selective call receiver deactivates its receiver until it is time for frame 3 to be transmitted. For example, when the baud rate is 512 bits per second and each frame takes 121.6 milliseconds the selective call receiver starts monitoring the transmission somewhat before 243.2 milliseconds after the end of synchronization code 18. After monitoring frame 3. the selective call receiver stops monitoring the broadcast until the next synchronization code is broadcast, at which time the cycle starts again. When no message is transmitted in any of the eight frames of a particular batch, an idle code-word is transmitted in each of the two code-words for that frame. This informs the selective call receivers monitoring that frame that no message is being transmitted during that particular batch.

Again referring to FIG. 2, addresses, also known as capcodes, span bits 2–19 of code-word 14 and thus are 18 bits long. Therefore, 2^18 or 262,144 different capcodes are available per frame. Since each selective call receiver only monitors one of the eight frames, each capcode can be used eight times thereby increasing the number of available addresses to over two million.

Amongst several message types, service providers transmit maildrop messages to their subscribers using a standard protocol such as POCSAG mentioned above. Maildrop messages are usually associated with information services, such as stock exchange information, sports scores, news items, weather information, etc. In general, a maildrop message comprises much more information than does an individual message. However, in many instances, maildrop messages are repetitive of a prior maildrop message but for a relatively small portion of changed or new data. In particular, existing maildrop messages include both headers and numerical data together, when in fact from one maildrop to the next only the numerical data changes. For example, when transmitting stock price information, the stock name, year high and year low information will change much less frequently than the stock's current trading price. As other examples, both sports scores and weather maildrop messages comprise, in one part, information that is updated on an infrequent basis such as team names or geographic data. Correspondingly, another part of the maildrop message comprises information that is frequently updated such as team scores and atmospheric conditions. In these examples, although information such as team names or geographic names change on an infrequent basis, the messages are typically retransmitted whenever any part of the message is updated. This is costly in terms of air time and system throughput.

Several prior art methods have attempted to reduce transmission overhead by using forms in the transmission of maildrop type messages. For example, U.S. Pat. No. 5,173, 688 issued to DeLuca et al. discloses a method for sending blank forms or tables to a pager which are filled in by subsequent communication or by the user. In general terms, data is divided into fields that contain header information or update information that are separately given protected or unprotected status. In particular, header fields generally contain alphanumeric data such as stock or team names and are given protected status while update fields such as current trading price or scores are given unprotected status. The effect of having "protected status" is that such data is not overwritten by new incoming data. On the other hand, an unprotected field is overwritten by subsequent messages.

Formatting techniques are used to define protected and unprotected fields. Specifically, field titles or designators are periodically transmitted to the selective call receivers. These titles or designators form the protected fields and are semi-permanently stored in the selective call receiver's memory. The data which changes regularly comprises the unprotected fields which are transmitted without designators, each field being separated from the next by only a carriage return symbol. Upon reception of a new message, the pager clears all unprotected fields and inserts the new update data into the unprotected fields and then displays both the protected and unprotected fields at the output of the selective call receiver. However, the reader cannot tell that only the unprotected data was sent, nor how much of the unprotected data has been updated. This approach significantly improves throughput when compared to resending entire messages, but transmits some redundant information.

Another example of sending a blank form is disclosed by Fascenda in U.S. Pat. Nos. *5,241,305* and 5,345,227. As disclosed. Fascenda teaches the use of mask blocks which are set aside for storing eight complete 40 character masks for use when receiving database type messages. Typically, a mask has zeros everywhere but where certain portions of the database are to be updated using a mask fill code-word. Once the mask has been transmitted and stored in a bit-mapped arrangement in the mask blocks and the non-zero portions are filled with individualized information (e.g.

stock info, etc.) a mask fill message including a mask fill code word can be transmitted to fill in the non-masked memory locations. In particular, to fill or change the contents of non-masked memory locations, a first code-word including a mask fill command, a mask ID and a database ID is transmitted. Thereafter, a second code-word comprising a start block. (i.e. the starting block number counting from the start of the database) and skip bits, which tell the microprocessor how many blocks are skipped after each mask is filled, is transmitted.

Fascenda discloses yet another way to increase the rate of database transmissions which contain identical information that arises in a recurring pattern in a database. One example would be in a stock database where the words "open," "close," and "high" occur on a regular basis. In this case Fascenda uses a format code-word which includes a format command, a database ID and start block to reproduce identical information in several memory locations without transmitting the identical information several times.

Although DeLuca et al. and Fascenda both disclose ways of transmitting database messages wherein parts of a database are updated on a regular basis, both impose constraints. When masks or forms are used, certain areas of memory automatically become protected or shielded from being updated. Moreover, when using Fascenda's mask method there will always be a finite number of masks available and therefore there is a trade off between reduction of transmission overhead and limiting the number of ways for updating any particular message. Accordingly, there is a present need for a method of transmitting new and updated messages that reduces transmission overhead while retaining the ability of updating any given portion of data contained in memory.

SUMMARY OF THE INVENTION

The embedded information receiver protocol solves the problems encountered by the prior art by the provision of an improved method for transmitting new or updated individual and multi-recipient messages from a system controller to selective call receivers for storage and use therein. The embedded protocol of the present invention is designed to be implemented in a variety of signalling protocols, including either POCSAG or FLEX signaling protocols and further to be implemented without requiring any changes to paging terminal software. Additionally, according to the present invention, a selective call receiver is provided comprising receiving means for receiving radio messages; a display for viewing information including received messages, user operable input means for controlling functions of the receiver, and storage means for storing messages received, the selective call receiver further comprising means for implementing the embedded protocol.

In general, the embedded protocol of the present invention is comprised of five field types, however all five fields need not be employed for effective use of the protocol. The first two fields comprise an extended subaddress which is used in conjunction with a selective call receiver's internal memory to determine whether the receiver is authorized to receive a message from a particular source. Alternatively, the embedded protocol can be used in conjunction with an individual source where a subaddress is not employed. In this instance, the embedded protocol may only require one field in order to be effectively used.

The third field type sets forth a processor command which performs one of a plurality of functions depending on the command. The present invention defines an extendible set of commands which are designed to provide features that permit a message previously stored in the selective call receiver to be updated in a manner which minimizes the overhead required in transmission. However, the command can instruct the processor to perform any of the processor's permissible functions. Additionally, command parameters may be included in this field or they may be integrated within the data.

The fourth type of field present in the embedded protocol comprises a flags character. The flags character is used in conjunction with certain of the commands defined for use with the embedded protocol. However, some commands do not require the use of a flags character and when this is the case, a flags character is not transmitted or received. The fifth and last field type defined by the protocol is a variable length data string that can be either alpha or numeric data or both.

The embedded protocol generally set forth above minimizes transmission overhead in several ways. Specifically, certain of the commands mentioned permit selective transmission or updating of any portion of an existing message such that changes can be made to the message without retransmitting unchanged portions of the existing message. Furthermore, the update type transmission can be applied to any type of message, not just database messages. Another advantage of the present invention is that the message structure is shortened when certain of the field types are not required to interpret the message.

BRIEF DESCRIPTION OF THE DRAWINGS

FIG. 1 illustrates the prior art POCSAG format.

FIG. 2 shows the POCSAG format for address and message code words.

FIG. 3 illustrates the general format of the embedded protocol in accordance with the preferred embodiment of the present invention.

FIG. 4 illustrates the general relationship between the subaddress and command fields of the embedded protocol and the selective call receiver's internal memory in accordance with the preferred embodiment of the present invention.

FIG. 5 illustrates the general format of the new message command in accordance with the preferred embodiment of the present invention.

FIG. 6 illustrates the general format of the short offset update command in accordance with the preferred embodiment of the present invention.

FIG. 7 illustrates the general format of the short offset update with flags command in accordance with the preferred embodiment of the present invention.

FIG. 8 illustrates the general format of the long offset update command in accordance with the preferred embodiment of the present invention.

FIG. 9 illustrates the general format of the multiple short offset command in accordance with the preferred embodiment of the present invention.

FIG. 10 is a continuation of the command format and parameters of the multiple short offset update command.

FIG. 11 illustrates the general format of the multiple long offset update in accordance with the preferred embodiment of the present invention.

FIG. 12 is a continuation of the command format and parameters of the multiple long offset update command.

FIG. 13 is a further continuation of the command format and parameters of the multiple long offset update command.

FIG. 14 illustrates a preferred format of the bits of the flags character in accordance with the preferred embodiment of the present invention.

FIG. 15 illustrates a pool of read/write memory contained within the selective call receiver of the present invention.

FIG. 16 illustrates a pool of read/write memory contained within the selective call receiver and the modified contents thereof.

FIG. 17 illustrates an example of the short offset update without flags command of the embedded protocol in accordance with the preferred embodiment of the present invention.

DESCRIPTION OF THE PREFERRED EMBODIMENT

Figure 18:
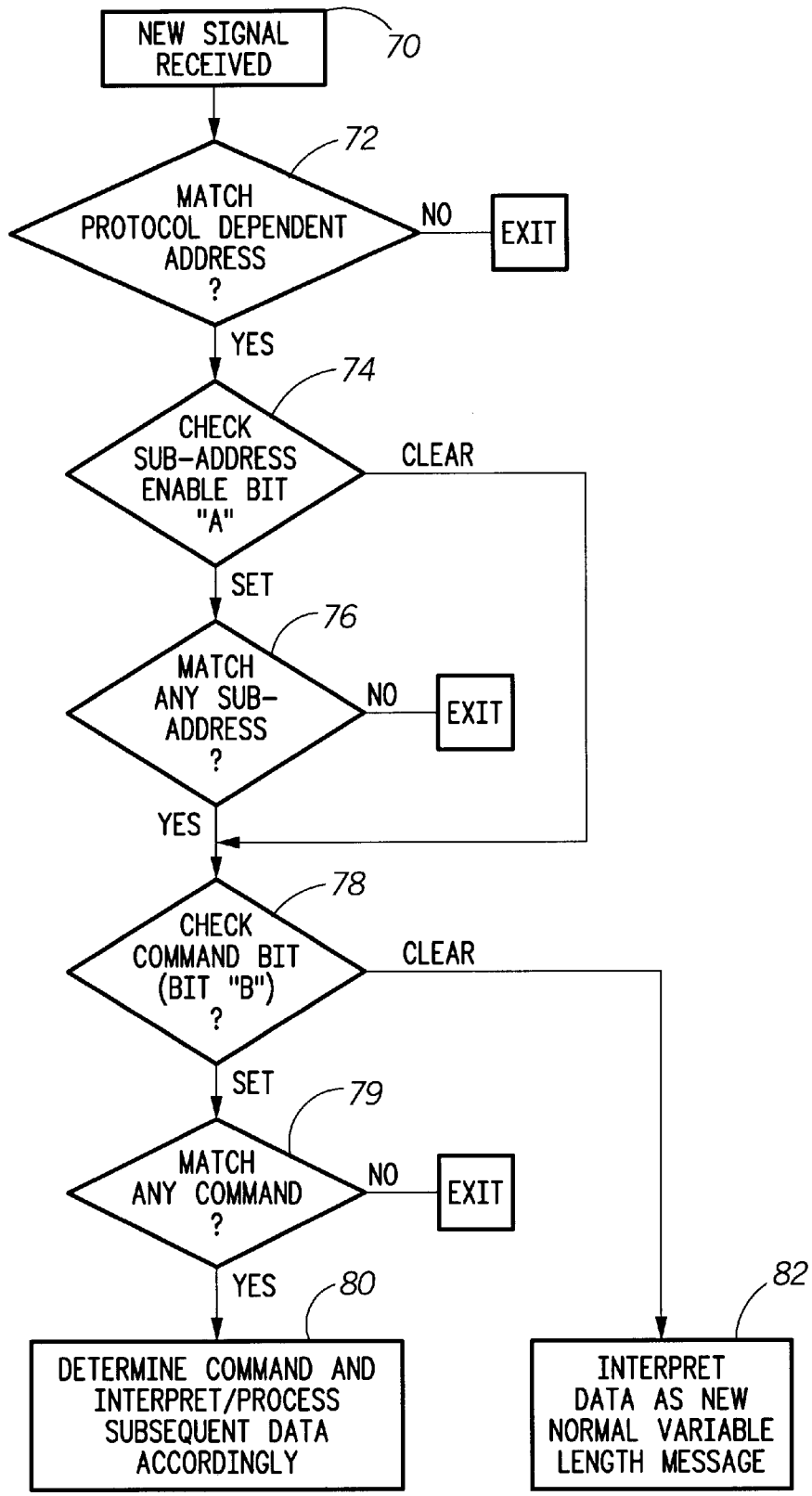
FIG. 18 illustrates a flow diagram of the method for receiving a message in accordance with the preferred embodiment of the present invention.

With reference to FIGS. 3–14 and 18. there is depicted an embedded protocol 10 for use with selective call message receivers in accordance with the preferred embodiment of the present invention. The general format of the protocol is set forth in FIG. 3 while specific examples of how the embedded protocol supports certain processor commands are shown in FIGS. 4–13. As mentioned above embedded protocol 10 is designed be implemented in either POCSAG or FLEX signaling protocols, however the examples set forth below illustrate the invention as practiced in a POCSAG format. Furthermore, while not specifically described in the following specification, it is realized that the embedded protocol of the present invention can be implemented in any standard protocol format and thus such embodiments are considered to be within the scope of this invention as an obvious modification of same.

As shown in FIG. 3, the general embedded protocol format 10 comprises five different field types, of which all are not required in the transmission or reception of any particular message. In general, the conventional protocol format 11 comprises primary source information 11 such as an address and function found in POCSAG. The first two field types 22 and 24 define an extended subaddress which is used in conjunction with a selective call receiver's internal memory to determine whether the receiver is authorized to receive a message from a particular individual or multi-recipient type source. Extended sub-addressing consists of taking the first two characters received and interpreting the first character 22 as the high order bits and the second character 24 as the low order bits. When eight bit transmissions are sent, the lower seven bits from each character are used, however for seven bit transmissions all bits from each character are used to give a range of 2^14 or 16,384 sub-addresses. The number of subaddresses may be decreased however when the paging transmitter terminal prohibits the use of certain characters, such as in the case of control characters of the ASCII code (American Standard Code for Information Interchange).

The target subaddresses may be either, group, maildrop or super-mail drop addresses depending on the source of the transmitted message. However, when the source is an individual source, sub-address fields 22 and 24 are generally not employed. In this case, the embedded protocol may only require three or less fields in order to be effectively used.

Figure 19:
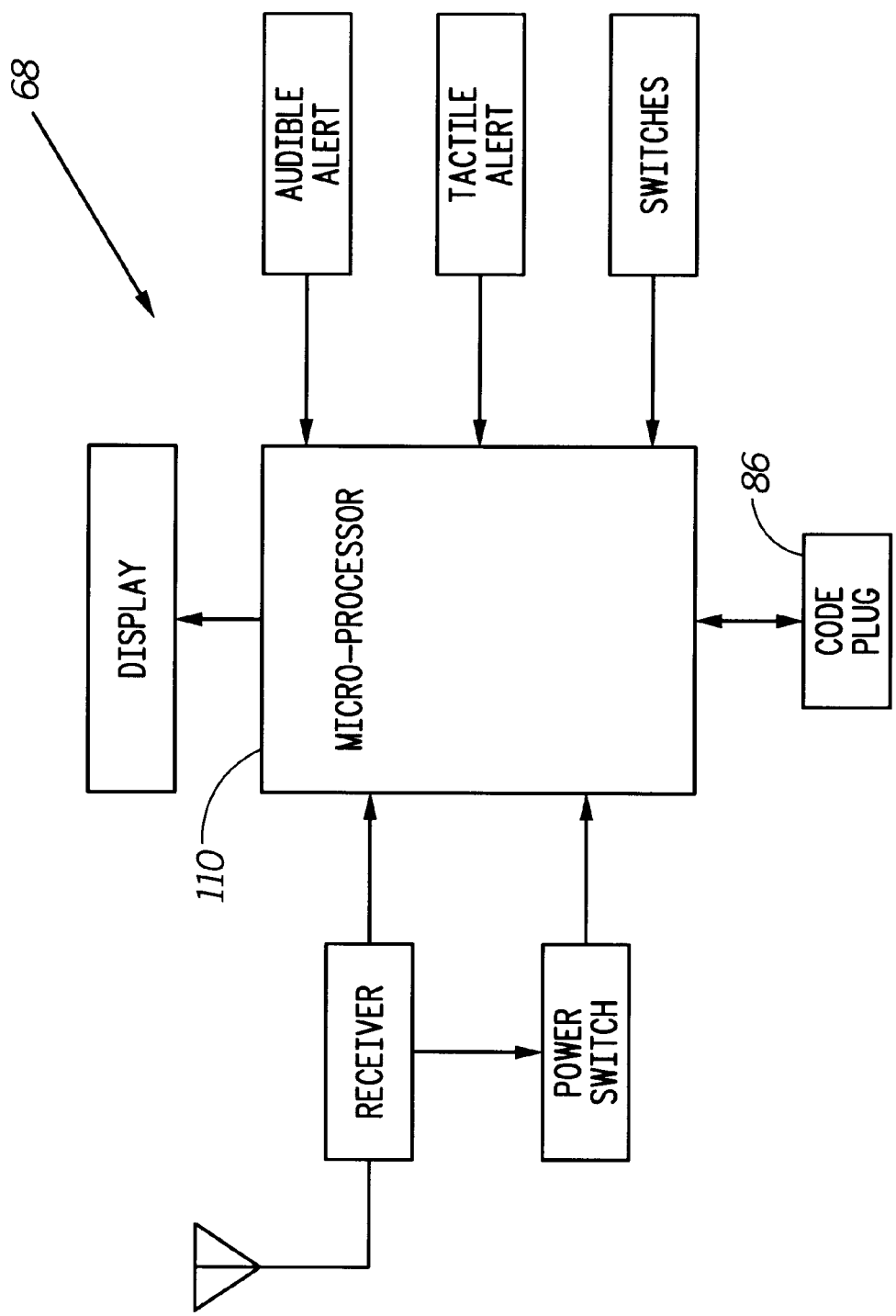
FIG. 19 illustrates a block diagram of a selective call receiver configured to implement the embedded protocol in accordance with the preferred embodiment of the present invention.

The third field type 18 defines a processor command which instructs the selective call receiver's microprocessor 110 (FIG. 19) to perform one of a plurality of functions depending on the command. The present invention defines commands which permit a message stored in a selective call receiver to be updated from information received in a radio signal in a battery efficient manner by minimizing overhead information required in the radio signal. Presently, six commands are supported by embedded protocol 10, however this set is easily extensible such that the protocol can evolve as needed without incompatibility with older versions.

FIGS. 5–13 define the six commands for use within embedded protocol 10. The initial command codes selected consist of characters that have an even value to allow simpler coding in implementation. The command parameters consist of flags and other required values. Preferably, when flags are used they are the first character after the command in the command parameters. However, as shown in FIGS. 5–13, some commands do not require a flags character. Generally, as shown in FIG. 14 the flags field 28 comprises one character of at least 7 binary bits, each of which indicate some generic information about the message character. In the preferred embodiment, valid flags characters are between 0x40–0x7F (wherein the prefix 0x designates that a hexadecimal value will follow). Accordingly, bit 6 is not used but is reserved for future use as are bits 0–2. Bits 4–5 define the protocol version. For example, the first version of this protocol is "00" and each subsequent version will be incremented accordingly. Bit 3 is an alert override indicator which causes a maildrop message to generate an individual alert in a selective call receiver.

The format and parameters of a "new" command are illustrated in FIG. 5. As shown, the "new" command is defined by a command code 30 (0x30) followed by flags character 28 and a variable length data message 34. The purpose of the "new" command is to create a completely new or to completely overwrite an existing message contained within the memory of a selective call receiver with a new or dataless message.

FIG. 6 illustrates the short offset command. Preferably, the short offset command is defined by command code 36 (0x3A) and a single character 38 in the range from 0x20–0x7F. From this range, the value 0x20 is subtracted leaving a range from 0x00–0x5F or 0–95 decimal. The short offset command provides a means for updating an existing message text at an offset from the beginning of the message. The single offset character 38 is used to start the update between 0 to 95 characters from the beginning of the data 34.

FIG. 7 illustrates a short offset with flags command, which is defined by command code 39 and parameters 28, 34, and 38. The only difference between the format of the previous command is a single flags character 28 which follows offset character 38. As discussed above, the flags character 28 indicates some generic information about the message such as the version of the embedded protocol in which the message has been transmitted.

FIG. 8 illustrates the long offset command which comprises a command code character 40, flags character 28, two offset characters 42–44 and a variable length message 34. The long offset command is similar to the short offset with flags command shown in FIG. 7, however the long offset command employs two offset characters 42 and 44 which fall within the range of 0x40 to 0x7F. In accordance with the following formula offset characters 42 and 44 define a long data offset as follows:

Long Data Offset=(Offset Character 1—0x40)*0x40+ (Offset Character 2—0x40).

Accordingly, offset characters 42 and 44 permit offsets between 0 and 4095 characters which is particularly useful for updates where update data is separated by more than 96 characters.

A derivative of the short offset command is the multiple short offset command. As shown in FIGS. 9–10, the multiple short offset command comprises a command code 48 (0x36) and a flags character 28 followed by a repetitive sequence comprising an offset character 52, data length character 54 and variable length data message 56. When the variable length data message exceeds 96 characters then an offset of 0 is sent with the next length and data parameters.

The multiple short offset command permits multiple updates to an existing message starting at an offset from the beginning of the message. Accordingly, this command permits a very flexible means for updating parts of messages without the need for fixed forms. The short offset value is used to start the update between 0 and 96 characters from the beginning of the message or from the end of a previously updated data. At the end of data 56 the following character is used as the short offset from the current memory location followed by length parameter 54 of the data to follow. Length parameter 54 consists of one character and provides a means for identifying how long the updated data extends into the message and therefore where the next offset or command will start. Preferably, length parameter 54 precedes data 56 and is based on a single character in the range of 0x20–0x7F from which 0x20 is subtracted and is generally the last parameter defined for commands that require it.

FIGS. 11–13 illustrate the multiple long offset command which comprises a command code 58 (0x32) and a flags character 28 followed by a repetitive sequence comprising two offset characters 60 and 62, data length character 64 and variable length data message 66.

The multiple long offset command permits multiple updates of an existing message starting at an offset from the beginning of an existing message. A long offset value determines where to start the update between 0 and 4095 characters from the beginning of an existing message or from the portion of a recently updated message. As in the multiple short offset, the length character 64 defines the data length in terms of characters. At the end of the data the subsequent two characters are used as the long offset from the current location followed by the length character 64. Accordingly, this command provides a very flexible means for updating parts of messages where updates are separated from one another by more than 96 characters without the need for fixed forms.

FIG. 18 illustrates the method in which a selective call message receiver 68 deciphers embedded protocol 10 of the present invention. The first step 70 includes receiving and decoding an address signal transmitted in a standard protocol format such as POCSAG or FLEX discussed supra. In the second step 72, the receiver deciphers a 32-bit address code-word 14 (FIG. 2) contained within the received signal to determine whether or not the selective call receiver is configured to receive messages from the source corresponding with the transmitted address code-word 14. In POCSAG, each selective call receiver can be permanently configured to receive information from up to 16 different sources by way of a code plug 86 (FIG. 19) which is preprogrammed at the factory. When code-word 14 (primary source information) matches one of the preprogrammed sources in code plug 86 microcomputer 110 of selective call receiver 68 will advance to step 74. On the other hand, when the address does not match one of the preprogrammed addresses in code plug 86 at step 72. the receiver will not decode the message information and selective call receiver 68 will exit the sequence shown until the next address code-word 14 is received.

As discussed above, when code-word 14 matches one of the preprogrammed sources in code plug 86 at step 72, selective call receiver 68 will receive and decode message code-word 16 (FIG. 2) of the POCSAG signal. Additionally, when a match occurs, a first configuration value, "BIT A," is checked in step 74 to determine whether subaddressing is enabled for that source. As illustrated in FIG. 4, when the selective call receiver 68 (FIG. 19) permits 16 different sources, receiver 68 has 16 corresponding "BIT A's," one for each source. When "BIT A" (i.e. first configuration value) is set for the source corresponding to the address received in code-word 14, selective call receiver 68 advances to step 76 to determine whether the subaddress characters 22–24 in the first and second fields correspond with any second configuration values in the look-up table (FIG. 4) for that source. When no matches are found, selective call receiver 68 interprets this condition to mean that receiver 68 is not configured to receive this message and exits to step 70 accordingly. However, when a match is found between subaddress characters 22–24 and a value stored in a table of second configuration values 112 for the corresponding source (i.e. table of subaddresses the pager is configured to receive messages from) or when "BIT A" is set in step 74 microprocessor 110 of receiver 68 advances to step 78 and checks whether a third configuration value. "BIT B," is enabled for that source. Similar to "BIT A," selective call receiver 68 has a corresponding "BIT B" (i.e. third configuration value) for each source it is configured to receive messages from. When "BIT B" is set, receiver 68 advances to step 79 and checks for a match between command 26 and a value stored in a table of fourth configuration values 114. When a match between command 26 and a value stored in table 114 occurs microprocessor 110 advances to step 80 where the command is interpreted and the message is processed accordingly. However, when no match occurs in step 79. microprocessor exits to step 70. Additionally, when "BIT B" is clear in step 78, selective call receiver 68 interprets the message as a new normal variable length message that does not contain a command character.

Each of the four configuration values (FIG. 4) are stored within the selective call receiver's 68 memory. Generally "BIT A" and "BIT B" are stored in the non-volatile code plug 86 where the third and fourth configuration values 112–114 are stored in look-up tables within the selective call receiver's random access memory. In alternate embodiments, however, any of the configuration values can be stored in any portion of the selective call receiver's memory.

As discussed above, when either "BIT A" is clear or "BIT A" is set and a match between the characters 22 and 24 and a value contained withing a table of second configuration values 112 (FIG. 4) is found, selective call receiver 68 will check "BIT B." When "BIT A" is clear and "BIT B" is set, subaddress characters 22–24 (FIG. 3) are not present and the selective call receiver 68 advances to step 79 and examines the first field for character 26 to determine whether there is a match between command character 26 and a table of fourth configuration values 114. However, when both "BIT A" and "BIT B" and microprocessor finds a matching second configuration value in step 76. selective call receiver 68 advances to step 79 and examines the third field to determine whether there is a match between command character 26 and fourth configuration value 112. When a match occurs, selective call receiver 68 advances to step 80 and processes the command and data accordingly. Otherwise, when no match occurs, receiver 68 interprets this condition to mean that receiver 68 is not configured to receive this command and exits to step 70. In a third scenario, both "BIT A" and "BIT B" are clear. In this case, selective call receiver 68 advances to step 82 and interprets this condition to mean that the message received is a new normal variable length message that does not contain sub-address characters 22–24 or command character 26. Finally, in the last case, "BIT A" is set and "BIT B" is clear and there is a match between characters 22 and 24 and second configuration value 112 (FIG. 4). In this case, selective call receiver 68 advances to step 82 and interprets this condition to mean that the message received is a new normal variable length message that contains subaddress characters 22–24 and no command characters.

FIGS. 15, 16, and 17 illustrate one possible example of how the short offset update command may be used. In particular, FIG. 15 illustrates a pool of memory containing stock type information such as stock name 92, current trading price 94, year high and year low titles 96–98. and corresponding data 100–102. Correspondingly, FIG. 16 illustrates the same pool of memory as FIG. 16 after the short offset update illustrated in FIG. 17 is executed. Note, only the current trading price 94 is changed from 72.5 to 79.5.

In order to execute the short offset updated shown in FIG. 17 the selective call receiver 68 (FIG. 19) must go through several steps. Assuming that receiver 68 is configured to interpret POCSAG, the receiver monitors a particular frame within batch 12. When a non-idle code-word 14 is sent, selective call receiver 68 compares code-word 14 with the code-words stored in code plug 86. In this case code-word 14 matches source 2 in code plug 86 and selective call receiver 68 interprets this condition to mean that a message is being sent from a source which it is configured to receive messages from. In the next step 72, microprocessor 104 checks the corresponding "BIT A" in code plug 86 for source 2 (FIG. 19) to determine whether subaddressing is enabled for that source. In this case, the stock information database is configured as a maildrop subaddress. Accordingly, "BIT A" is set in code plug 86 for this source. In step 74, microprocessor 110 compares the combined subaddress 22–24 (FIG. 3) with a table of second configuration values 112 (FIG. 4) corresponding to source 2 to determine whether any matches occur. In this case, the combined subaddress 22–24 match a second configuration value stored in the table, and thus the microprocessor 110 locates the first memory location in the corresponding maildrop. Thereafter, in step 78, microprocessor 110 checks "BIT B" for source 2 in code plug 86 to determine whether commands are enabled for source 2. In this case, "BIT B" is set and therefore commands are enabled for source 2. Accordingly, microprocessor 110 advances to step 79 where it compares command character 26 with the table of fourth configuration values corresponding with source 2. In this case, character 0x3A matches a fourth configuration value 114 in the table. Accordingly, microprocessor 110 advances to step 80 where the short offset command, offset character 38, and data 24 are interpreted and processed. In response, the microprocessor offsets 11 characters from the beginning of the maildrop starting address and updates that memory location with the number "9" thereby changing the current trading price 94 from 72.5 to 79.5.

Figure 20:
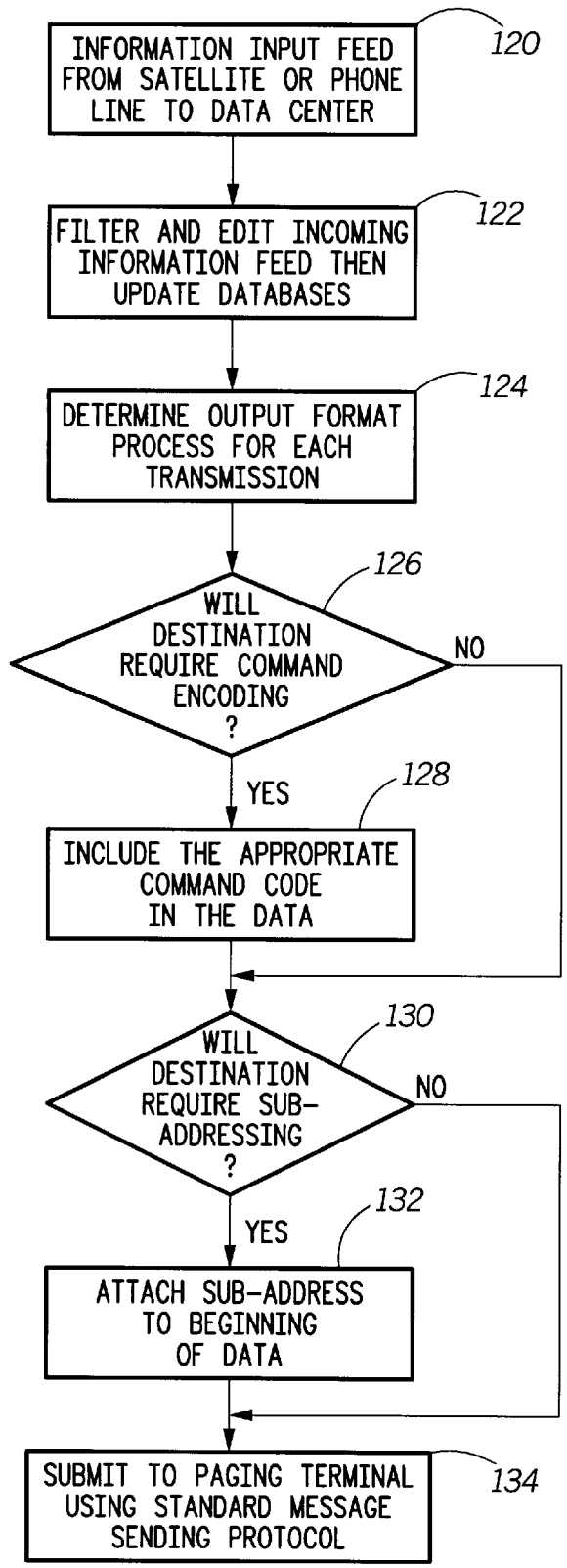
FIG. 20 illustrates a flow diagram of the method for transmitting a message in accordance with the preferred embodiment of the present invention.

FIG. 20 is a flow diagram of the method of sending a message using the embedded protocol of the present invention. Steps 120–124, as shown, depict the steps taken to input, edit and format messages and are not specifically required as part of the embedded protocol. Step 126 begins the method for encoding a message in accordance with the embedded protocol. Specifically, when commands are used, a command code 26 is attached to the beginning of the data portion of the message in step 126. However, when a command 26 is not employed, no command is attached and the processes advances to step 130. In step 130, a determination is made whether the destination of the message requires a subaddress and when so required, subaddress characters 22–24 are attached to the beginning of the data portion of the message in step 128. On the other hand, when no subaddress is required, step 132 is skipped and the method advances to step 134. In step 134, the entire message is submitted to the paging terminal using a standard message protocol.

It will be appreciated that the embedded protocol described herein, in accordance with the preferred embodiment of the present invention substantially improves the efficiency and flexibility of updating messages stored in selective call receivers by reducing the length of the transmissions used to accomplish the updating.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A selective call receiver for receiving and storing a variable length message, said receiver comprising a processor coupled to a memory element, said receiver configured to receive a signal transmitted in a standard protocol format comprising an address portion and a message portion, said receiver further comprising:

means for receiving primary source information within said address portion of said signal;

means for determining whether said receiver is permitted to receive messages from a source corresponding with said primary source information;

means for determining whether said message portion of said standard protocol format includes an offset update command and variable length data; and means for receiving and storing said message portion of said signal within said memory element, wherein said means for receiving and storing offsets a command parameter specified number of characters from the beginning of an existing message stored in said memory element prior to writing the variable length data over a portion of said existing message, when said message portion includes said offset update command, wherein the command parameter can specify an offset to any character within a range of at least 32 characters.

2. The selective call receiver as set forth in claim 1 wherein said standard protocol format is FLEX.

3. The selective call receiver as set forth in claim 1 wherein said standard protocol format is FLEX.

4. The selective call receiver as set forth in claim 1 wherein said receiver further comprises a means for decoding at least one flags character transmitted within said message portion of said standard protocol format, said at least one flags character indicating generic information about said variable length message.

5. A method for disseminating a variable length message to at least one selective call receiver comprising a processor coupled to a read/write memory, said selective call receiver configured to receive messages in a standard protocol format comprising an address portion and a message portion, said method comprising the steps of:

(a) transmitting an offset update command within the message portion of said standard protocol format; and (b) transmitting the variable length message including variable length data;

wherein said offset update command causes said at least one receiver to offset a command parameter specified number of message characters from the beginning of said existing message prior to writing said variable length data over said existing message in said read/write memory, wherein the command parameter can specify an offset to any character within a range of at least 32 characters.

6. A selective call receiver for receiving and storing a variable length message, said receiver comprising a processor coupled to a memory element, said receiver configured to receive a signal transmitted in a standard protocol format comprising an address portion and a message portion, said receiver further comprising:

means for receiving primary source information within said address portion of said signal;

means for determining whether said receiver is permitted to receive messages from a source corresponding with said primary source information;

means for determining whether said message portion of said standard protocol format includes a multiple offset command and means for receiving and storing said message portion of said signal within said memory element, wherein, when said message portion includes said multiple offset command, said means for receiving and storing offsets a command parameter specified number of characters from the end of a first portion of an existing message stored in said memory element, prior to writing over a second portion of said existing message, wherein the first portion has also been written over in response to said multiple offset command.

* * * * *

UNITED STATES PATENT AND TRADEMARK OFFICE
CERTIFICATE OF CORRECTION

PATENT NO. : 5,910,778
DATED : June 8, 1999
INVENTOR(S) : Klein et al.

It is certified that error appears in the above-indentified patent and that said Letters Patent is hereby corrected as shown below:

Column 10, line 65, delete "FLEX" and insert --POCSAG--

Signed and Sealed this

Sixth Day of June, 2000

Attest:

Q. TODD DICKINSON

*Attesting Officer*     *Director of Patents and Trademarks*